CONTROL OF TRANSMISSION IN TWO-WAY TELEPHONE SYSTEMS

Original Filed Feb. 8, 1939 5 Sheets-Sheet 1

INVENTOR
D. MITCHELL
BY
Earl C. Laughlin
ATTORNEY

CONTROL OF TRANSMISSION IN TWO-WAY TELEPHONE SYSTEMS

Original Filed Feb. 8, 1939 5 Sheets-Sheet 2

INVENTOR
D. MITCHELL
BY
Earl C. Laughlin
ATTORNEY

CONTROL OF TRANSMISSION IN TWO-WAY TELEPHONE SYSTEMS

Original Filed Feb. 8, 1939 5 Sheets-Sheet 3

INVENTOR
D. MITCHELL
BY
Earl C. Laughlin
ATTORNEY

June 17, 1941. D. MITCHELL Re. 21,835

CONTROL OF TRANSMISSION IN TWO-WAY TELEPHONE SYSTEMS

Original Filed Feb. 8, 1939 5 Sheets-Sheet 4

INVENTOR
D. MITCHELL
BY
Earl C. Laughlin
ATTORNEY

CONTROL OF TRANSMISSION IN TWO-WAY TELEPHONE SYSTEMS

Original Filed Feb. 8, 1939 5 Sheets-Sheet 5

INVENTOR
D. MITCHELL
BY
Earl C. Laughlin
ATTORNEY

Reissued June 17, 1941 Re. 21,835

UNITED STATES PATENT OFFICE 21,835

CONTROL OF TRANSMISSION IN TWO-WAY TELEPHONE SYSTEMS

Doren Mitchell, Bound Brook, N. J., assignor to Bell Telephone Laboratories, Incorporated, New York, N. Y., a corporation of New York Original No. 2,213,991, dated September 10, 1940, Serial No. 255,223, February 8, 1939. Application for reissue November 30, 1940, Serial No. 338,093

19 Claims. (Cl. 178—44)

The invention relates to two-way telephone transmission systems and particularly to circuits for automatically controlling transmission in such systems.

The invention is particularly applicable to and will be described in connection with a two-way telephone conference system. The purpose of such a system is to enable communication to be carried on between persons located at widely separated points with a facility approaching that obtainable when they are gathered together in conference at a single location. A special case of such a conference system is that in which two-way telephone communication is carried on between several groups each containing a number of conferees, respectively located at different widely separated stations, a single telephone transmitter and a single loud-speaking telephone receiver at each station being used in common by each of the persons in the group at the station to communicate simultaneously with all of the conferees in the group at another station and the voice currents of each talker automatically controlling volume control and directional switching apparatus at the two stations to adjust the gain of the talking circuit while preventing singing and suppressing echoes and noise.

An object of the invention is to improve the operation of systems of the above type.

Another object is to combine and relatively arrange automatic devices for exercising different types of control on transmission in a two-way signaling system in such manner as to provide improved operation of the system.

A related object is to provide maximum gain in a two-way signal transmission system consistent with the maintenance of anti-singing conditions and discrimination against echoes, and room and line noises.

These objects are attained in accordance with the invention by employing particular combinations and arrangements of limited volume range expanders, echo suppressors and volume limiters with proper selection and relative adjustment of their operation characteristics.

Figure 1:
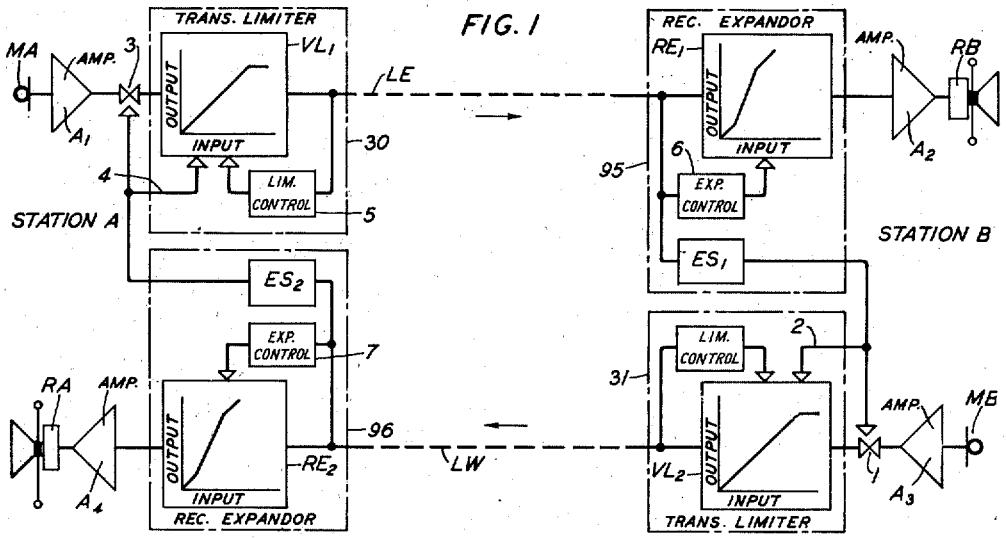
Figure 2:
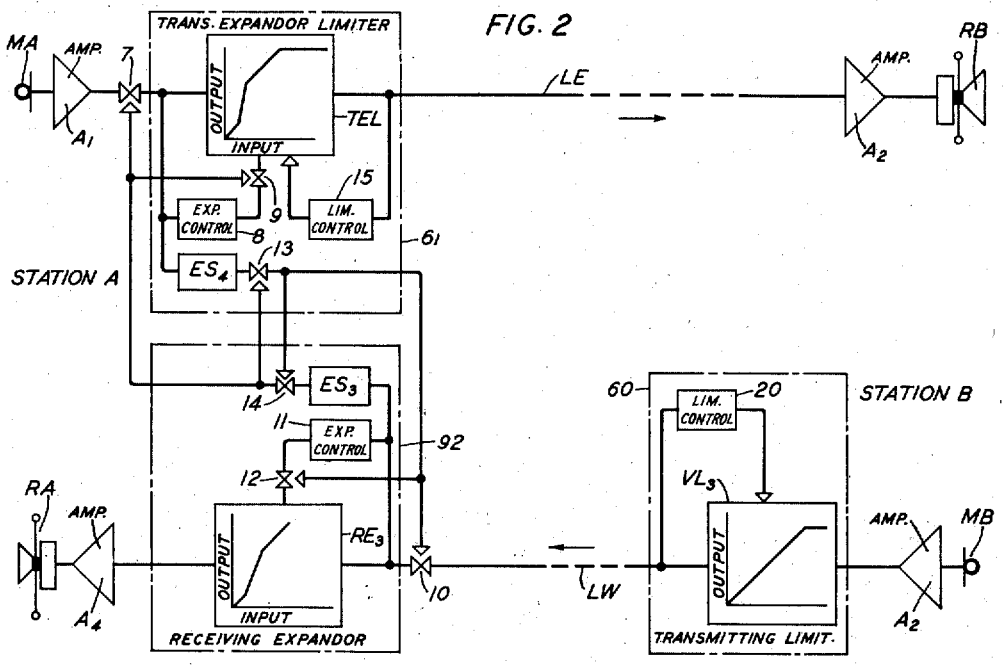
Figure 3:
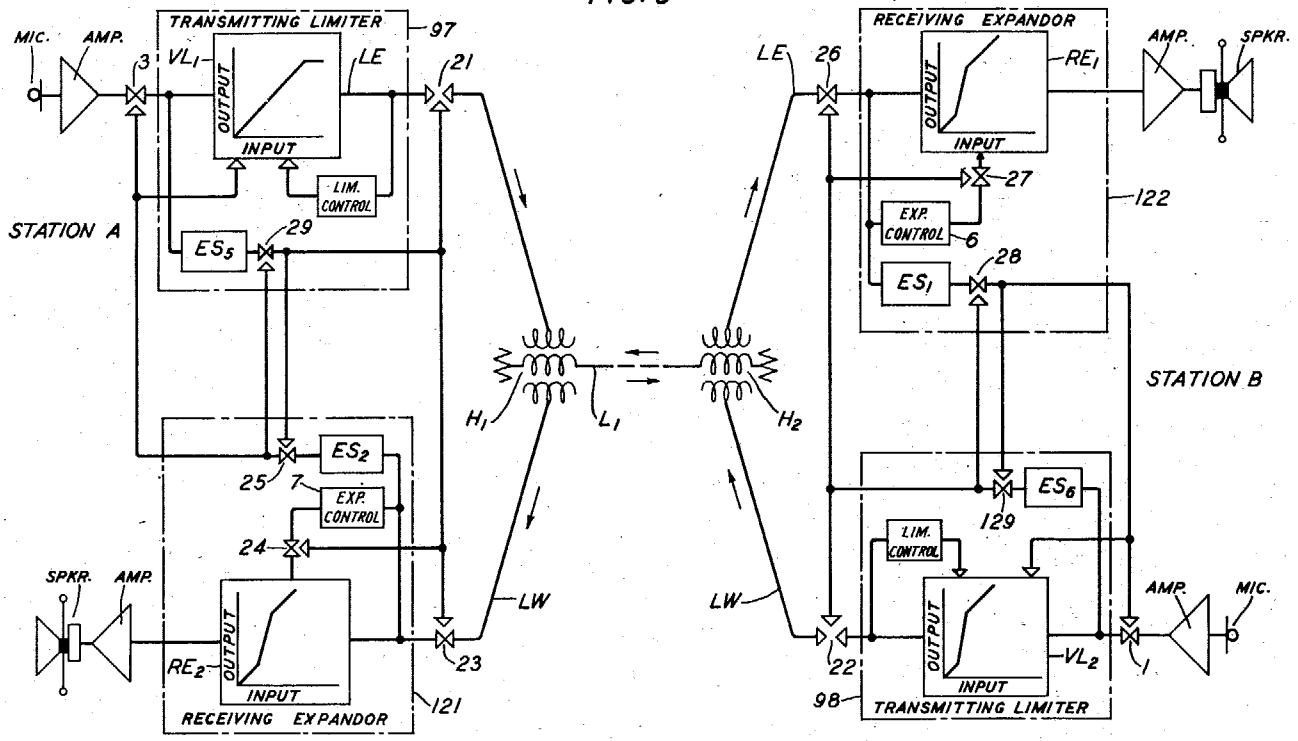
Figure 4:
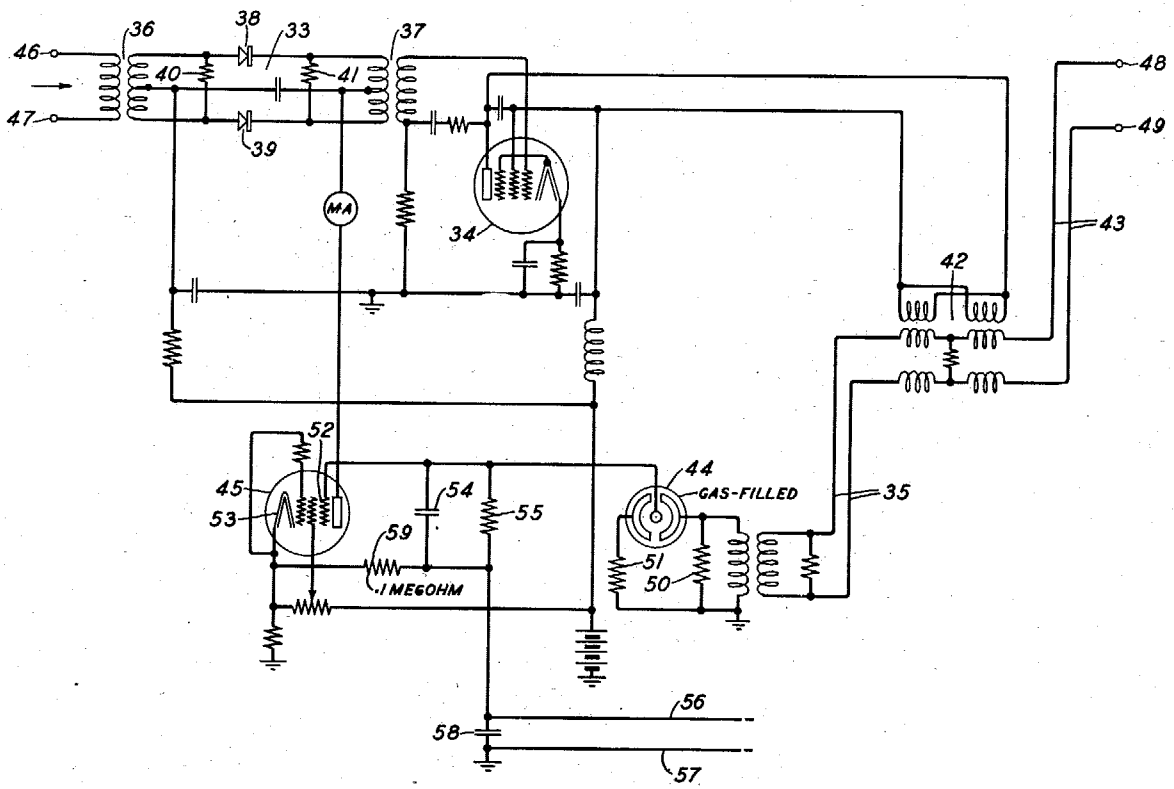
Figure 5:
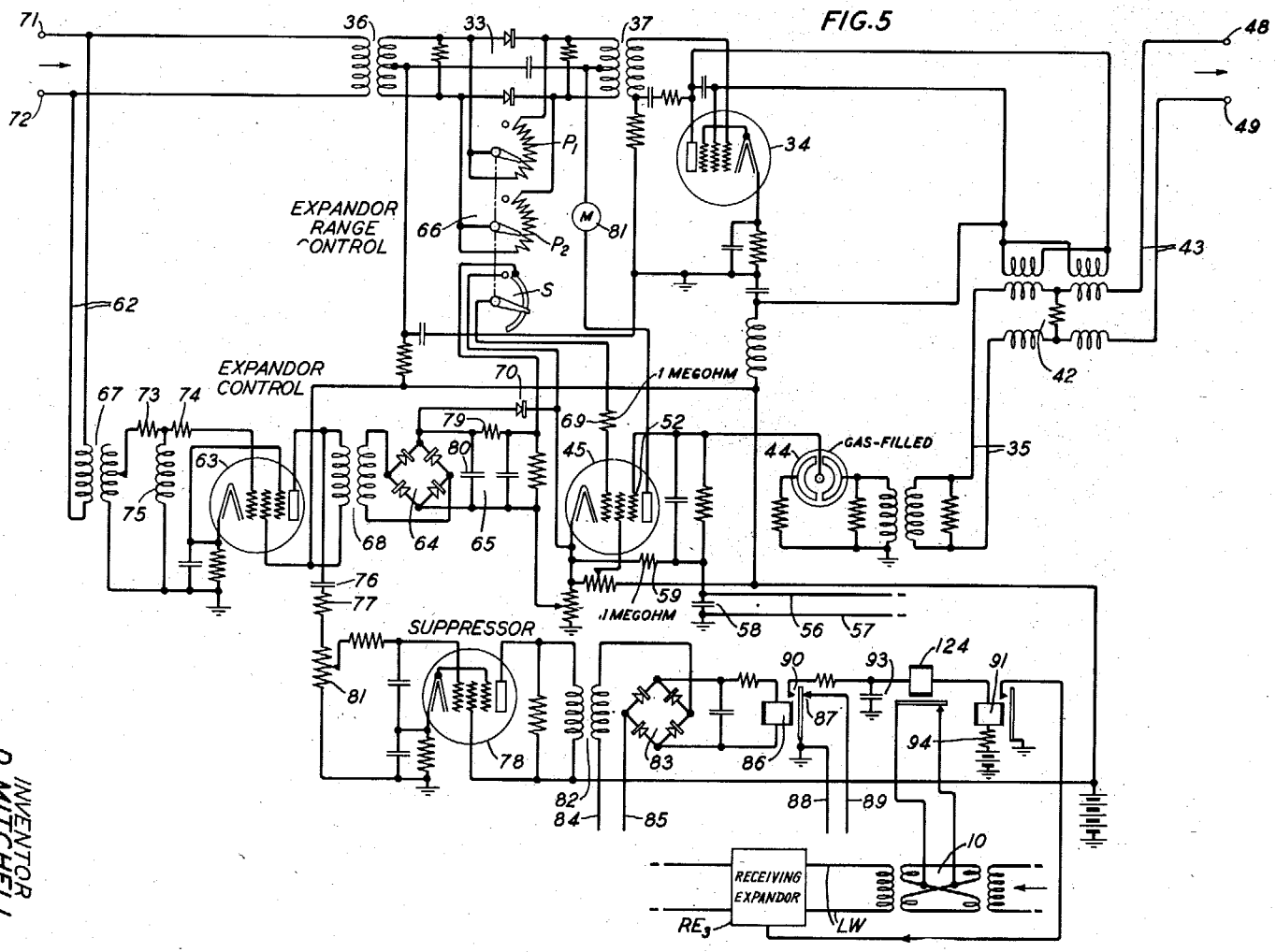
Figure 6:
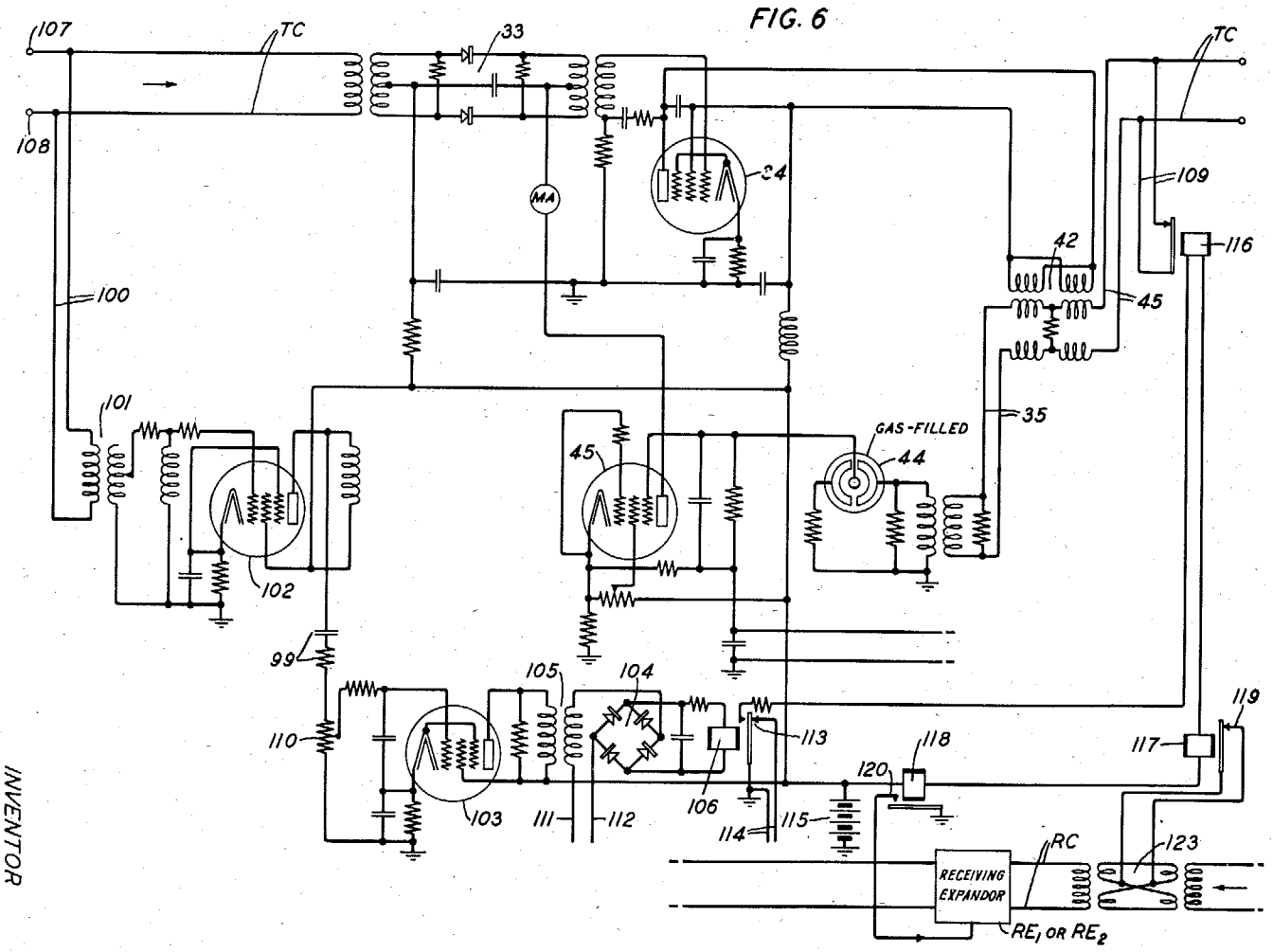

The various objects and features of the invention will be understood from the following detailed description thereof when read in connection with the drawings:

Figs. 1, 2 and 3 of which show diagrammatically different modifications of the invention respectively applied to four-wire and two-wire telephone circuits; and Figs. 4, 5 and 6 of which show schematically the preferred circuits of apparatus used in the systems of Figs. 1 to 3 to obtain the desired characteristics.

Figs. 1 to 3 show in single-line functional schematic form different modifications of the invention applied to four-wire or two-wire telephone circuits connecting two terminal stations A and B, which may be rooms at widely separated points, in each of which are gathered different groups of persons who desire to confer with persons in their own and the other groups as if they were all present in a single room at one location.

In these three figures, each of the single lines represents two-wire electrical transmission paths or circuits, and the transmission apparatus in the circuits at the two terminal stations are illustrated by usual simplified representations or by suitably labeled boxes. Those units in the speech transmission circuits at the terminal stations, which operate to perform loss control or volume limiting functions have rough graphical representations of their input-output characteristics inserted within the boxes. In addition, an arrow pointing from one box to another indicates that the apparatus represented by the first box operates to control the apparatus represented by the other box in a manner to be described. A normal make in a transmission path is indicated by contacting arrowheads and a normal break in a path by separated arrowheads. An arrow directed from a box to a make point in a transmission path indicates that the path will be disabled at that point by the operation of a voice-operated device represented by the box, and an arrow directed from a box to a break point in a path indicates that the path will be enabled at that point by operation of a voice-operated device represented by the box.

The chief purposes of the automatic control circuits in the different modifications of the invention illustrated in Figs. 1, 2 and 3 are:

(1) To provide an over-all acoustic gain between stations connected by a four-wire or two-wire telephone circuit so that the distant talker may be heard at a higher volume level than the local talker, thus, in effect, compensating for the fact that the two talkers are located at widely separated points, while preventing the possibility of a singing condition being set up around the whole circuit, and (2) To suppress objectionable echoes and noise.

These purposes are accomplished by the circuits of the invention in a somewhat different manner in the systems of Figs. 1 to 3.

In the system of Fig. 1, the four-wire telephone circuit comprises a one-way transmission path LE including the one-way amplifying devices $A_1$ and $A_2$ for repeating the telephone currents generated by a suitable microphone MA at a west station A to a suitable loud-speaking telephone receiver RB at an east station B, and a one-way transmission path LW including the one-way amplifying devices $A_3$ and $A_4$ for repeating the telephone currents generated by a suitable microphone MB at the east station B to a suitable loud-speaking telephone receiver RA at the west station A.

An automatic volume limiter device $VL_1$, having an input-output characteristic such as shown within the box so labeled, is connected in the path LE at station A near the output of the amplifier $A_1$ and an automatic volume limiter device $VL_2$, having a similar input-output characteristic indicated within the box so labeled, is connected in the path LW at station B. A limited volume range expander device $RE_1$, having an input-output characteristic such as shown within the box so labeled, is connected in the receiving end of path LE at station B in the input of the amplifier $A_2$, and a similar limited volume range expander device $RE_2$, having an input-output characteristic such as shown in the box so labeled, is connected in the receiving end of the path LW at station A in the input of the amplifying device $A_4$.

In addition to the elements referred to above, the system of Fig. 1 includes a suppressor device $ES_1$ connected to the path LE at station B at a point in front of the expander device $RE_1$, and operating in response to applied telephone signals in that path to effectively disable the path LW at a point 1 in front of the volume limiter device $VL_2$, and to the control over a branch control circuit 2 the latter device to simultaneously reduce its gain a given amount, and a suppressor device $ES_2$ connected to the path LW at station A in front of the expander device $RE_2$ and operating in response to applied telephone signals in that path to effectively disable the path LE at a point 3 in front of the volume limiter device $VL_1$, and to control over the control branch 4 the latter device to simultaneously reduce its gain a given amount.

The suppressor devices $ES_1$ and $ES_2$ and the similar devices shown in the succeeding figures may be of any suitable type but preferably are of the type employing an amplifier-detector and relays operated from the output thereof to open or close electrical circuits to give the required control, such as are commonly used in echo suppressors or similar voice-operated switching circuits.

To illustrate the operation of the system of Fig. 1, let it be assumed that one of the persons in conference in the room at the west station A is speaking. This speech will be picked up by the microphone MA, and after amplification in the amplifier $A_1$ the talker's voice currents will pass on through the suppression point 3 in the path LE, which is in its normal condition providing little or no loss in that path, and then through the volume limiter device $VL_1$. As indicated by the characteristic curve shown, the device $VL_1$ automatically operates as an ordinary amplifier to produce a signal output which is proportional to the signal input up to a selected point of maximum gain, say 15 decibels, determined by the overload and cross-talk limits of the transmission path LE. Speech inputs to the device $VL_1$ of a level above the selected point of maximum gain, say above about −15 decibels referred to reference volume, cause the limiter control 5 of the device $VL_1$ to function to prevent the speech output of that device from rising appreciably above reference volume. From the output of the device $VL_1$, the west speaker's speech signals pass over the path LE to the east station B.

At the east station B a part of west's speech signals passes into the input of the expander control circuit 6 and into the input of the suppressor circuit $ES_1$, and the main part passes through the receiving volume range expander device $RE_1$. As indicated by the characteristic curve within the box, for very low inputs the over-all gain of the device $RE_1$ is small. Higher inputs operate the expander control branch 6 which controls the device $RE_1$ to increase its over-all gain so as to effectively switch loss out of the signal path LE in an amount proportional to the amplitude level of the applied signals. Above a certain input amplitude, the control 6 operates to maintain the gain in the expander device at a fixed maximum value. The signal output of the expander $RE_1$ is amplified by the amplifier $A_2$ and then is impressed on the loud-speaking receiver RB so that it is heard by the listeners at station B.

The portion of west's speech energy which enters the input of the suppressor $ES_1$ causes its operation to disable the path LW at the point 1 in front of the transmitting volume limiter $VL_2$, as by opening that path or short-circuiting it, and through the control branch 2 simultaneously operates on the volume limiting device $VL_2$ to reduce its gain about 25 decibels, thus effectively inserting an additional loss of that amount in the path LW. The time actions are preferably so arranged (in a manner to be described later) that this additional loss is in the path when the control at 1 releases and is removed in a continuous manner over a few milliseconds after control 1 releases. These two losses prevent any echoes of west's speech which might be picked up by the microphone MB from the output of the loud-speaker RE from returning to the west station W over the path LW. The additional 25-decibel gain decrease was found necessary in an experimental system of the invention in accordance with Fig. 1 because of the fact that on suddenly applied strong inputs such as would result when the east receiving suppressor $ES_1$ released while an east talker was speaking loudly, the west receiving expander $RE_2$ would make too large an increase of gain before the west suppressor $ES_2$ could operate to cut off the west transmitting path at the point 3. Thus without the insertion of the 25-decibel loss in the volume limiter $VL_2$, a short echo would get back around the entire circuit to the east loud-speaking receiver RB, and would be heard as a sharp "pop," and it occasionally would cause false operation of the east suppressor device $ES_1$.

To prevent singing and to properly suppress echoes for the amount of over-all gain inserted by the receiving expander device in the system of Fig. 1, the suppressor devices $ES_1$ and $ES_2$ are designed to operate in response to received voice signals of a level part way up the expansion range of the expander devices $RE_1$ and $RE_2$, the latter range being determined by the amount of over-all acoustic gain required between the two terminal stations A and B of the system in order that the distant talker may be heard at a higher volume than the local talker. Preferably, the sensitivity of each receiving suppressor device would be adjusted so that it will operate to insert a large disabling loss in the echo path when the amount of loss removed by the expander in the path transmitting signals is slightly less than that which would produce singing around the system and objectionable echoes. Each receiving suppressor device $ES_1$ and $ES_2$ would also be arranged in any suitable manner to have sufficient hang-over in operation to prevent its release until the level of the echoes of received speech at the station is decreased to a value below the operate point of the suppressor device on the other side of the circuit.

The operation of the system of Fig. 1 in the direction from east to west is similar to that for the direction from west to east described.

If there is an appreciable delay of D seconds in transmission over each side of the four-wire circuit in the system of Fig. 1, and if the talker on the west end starts speaking within D seconds before or after the talker starts, the speech of each talker might be mutilated in the manner usually referred to as partial lockout. Such partial lockout might be prevented in the system of Fig. 1 by employing receiving circuit suppressors operated from the transmitting side of the circuit in addition to the transmitting circuit suppressors operated from the receiving sides illustrated. Such an arrangement, however, might make it possible to get complete transmission lockouts when the west talker starts speaking within D seconds before or after the east talker starts.

Although either partial or complete lockouts for short periods of time are probably not serious defects in the types of systems with which the circuits of the invention would ordinarily be used, one way to avoid them would be to do all of the echo suppressor switching at one end of the system. The unsymmetrical arrangement of volume range expanders and volume limiters illustrated in Fig. 2 accomplishes this.

In the system of Fig. 2, a combined limited volume range expander and volume limiter TEL having an input-output characteristic such as shown within the box so labeled is connected in the west-to-east path LE in the output of the amplifier $A_1$ at station A. A limited volume range expander $RE_3$ without a limiter, similar to the devices $RE_1$ and $RE_2$ in the system of Fig. 1, is connected in the receiving side of the east-to-west path LW at station A in the input of the amplifier $A_4$, but the similar device used in the receiving side of the path LE at station B in the system of Fig. 1, is eliminated in the system of Fig. 2. A volume limiter device $VL_3$, similar to the devices $VL_1$ and $VL_2$ used in the system of Fig. 1, except for the elimination of the suppressor control 4 or 2 therefrom, is connected in path LW in the output of amplifier $A_2$ at station B.

The suppressor apparatus, all of which is located at the station A, comprises a suppressor device $ES_3$ connected to the path LW in front of the expander device $RE_3$ and operating in response to applied telephone signals in that path to disable the path LE at station A at a point 7 in front of the transmitting expander-limiter device TEL, and to disable the expander control circuit 8 for that device at the point 9. A similar suppressor device $ES_4$ is connected to the path LE at station A at a point between the suppression point 7 and the input of the device TEL and operates in response to applied telephone signals from that path to disable the path LW at station A at the point 10 in front of the expander device $RE_3$ and the point of connection of the suppressor $ES_3$ to the path LW, and to disable the expander control circuit 11 for the device $RE_3$ at the point 12. Operation of the suppressor device $ES_3$ also disables the suppressor device $ES_4$ at a point 13 in its output, and operation of the suppressor device $ES_4$ also disables the suppressor device $ES_3$ at a point 14 in its output. The other elements of the system of Fig. 2 are the same as in the system of Fig. 1 as indicated by the use of the same characters for identifying the corresponding elements.

The system of Fig. 2 operates as follows: Let it be assumed that a person at station A is talking. His speech will be picked up by the microphone MA and the speech currents in the output thereof will be amplified by the amplifier device $A_1$ and transmitted through the suppression point 7 in the path LE, which is in its normal condition providing little or no loss in that path. Part of the amplified energy will then be transmitted through the transmitting expander-limiter TEL, while the other part is divided between the input of the transmitting expander control circuit 8 and the input of the suppressor device $ES_4$. The transmitting expander control 8 operates in response to the impressed speech currents to control the gain of the transmitting expander-limiter device TEL in the manner indicated by the input-output characteristic diagram shown within the box. Thus for very low inputs, this device has effectively no gain. When the input rises to a certain point, however, the expander control 8 operates to make the output begin to rise faster than the input, or in other words, gain is introduced. This takes place for a certain part of the range of input as shown, until at another point the output again starts to go up equally with the input. When the input level of the signals applied to the device TEL exceeds a certain maximum level, the limiter control 15 operates to prevent further increase in output with further increases in input level, the operating point of the limiter control 15 being selected to maintain the transmitted signal energy within the overload and cross-talk limits of the system.

The portion of west's signaling current diverted into the input of the suppressor device $ES_4$ operates in the manner previously described to disable the path LW at station A in front of the receiving expander device $RE_3$, to disable the receiving suppressor device $ES_3$ and to disable the expander control 11 for the receiving expander device $RE_3$. By any suitable means, a certain amount of hang-over, say about 0.2 second, is given to the disabling circuits controlled by operation of the suppressor $ES_4$, so that after west's speech has passed through the transmitting expander-limiter device TEL, the disabling action described will be continued for a sufficient time for room echoes at the far end of the system to become attenuated to a value which will not cause false operation of the receiving suppressor $ES_3$ when the transmitting suppressor $ES_4$ releases.

The disabling of the receiving expander control 11 by operation of the transmitting suppressor $ES_4$ may be accomplished, for example, through a condenser-resistance network having the proper time constants, so that the expander cannot build up its gain suddenly on release of the transmitting suppressor $ES_4$ if there is speech present on the LW side of the circuit. This time action is provided to prevent false operation of the transmitting suppressor $ES_4$ on short impulses that would otherwise pass the suppression point 10 in the path LW before the receiving suppressor $ES_3$ could operate.

From the output of the device TEL west's speech currents pass over the line LE to the east station B and after amplification by the amplifying device $A_2$ at that station are impressed on the loud-speaking receiver RB at station B and will be heard at that station.

The operation of the system of Fig. 2 for transmission in the direction from east to west from station B to station A is as follows: The speech currents in the output of the microphone MB at the east station B are amplified by the amplifying device $A_2$ and passed directly into the volume limiter device $VL_3$ which operates in a manner similar to that previously described for the limiter devices $VL_1$ and $VL_2$ in the system of Fig. 1 as an amplifier to produce an output directly proportional to input up to the point of maximum gain (15 decibels) at which point the limiter control 20 operates to prevent further rise in output with increased input, so as to maintain the transmitted speech signals within the overload limits of the system.

From the output of the device $VL_3$ east's voice signals are transmitted over the path LW to station A where a portion of them is transmitted through the receiving expander device $RE_3$ and other portions are diverted into the input of the expander control 11 of that device and the input of the suppressor device $ES_3$. The expander control 11 operates to control the gain of the device $RE_3$ to provide an input-output characteristic such as shown within the box so labeled, in a manner similar to that previously described for the devices $RE_1$ and $RE_2$ in the system of Fig. 1. The suppressor device $ES_3$ operates in the manner previously described in response to the applied voice currents to disable the path LE at station A in front of the transmitting expander-limiter TEL, to disable the expander control 8 for that device and to disable the suppressor device $ES_4$. The voice currents in the output of the device $RE_3$ are amplified by amplifier $A_4$ and impressed on the receiver RA so that they are heard at station A.

The expansion limits for the transmitting expander-limiter device TEL and the receiving expander device $RE_3$ will depend on the amount of loss necessary to be switched out of the paths LE and LW by these devices to give the required amount of acoustic gain between the two stations A and B for the two directions of signal transmission. As in the case of the similar devices in the system of Fig. 1, the sensitivities of the suppressor devices $ES_3$ and $ES_4$ are set, so that these devices will operate in response to applied voice signals from the paths LW and LE, respectively, of a level part way up the expansion range of the receiving expander device $RE_3$ and the transmitting expander-limiter device TEL, respectively, when the loss removed by the expander device is slightly less than that which would produce singing around the system and objectionable echoes. The point of maximum gain allowed by the limiter portion of the transmitting expander-limiter TEL and by the transmitting limiter $VL_3$ is selected so as to hold the level of the transmitted signals over the paths LE and LW, respectively, within the overload and cross-talk limits of that path.

In some cases where the line noise is excessive, it may be of advantage to modify the system of Fig. 2 to add a receiving expander device, similar to the device $RE_3$ in the path LW at station A, in the receiving side of the path LE at station B to reduce this noise. In that case, the transmitting device TEL in the transmitting side of the path LE at station A would be designed to operate on through transmission merely as an amplifier and as a volume limiter for very high inputs.

Fig. 3 shows a modification of the invention applied to a two-wire circuit in which the west-to-east and east-to-west signal transmission circuits have an intermediate two-wire, two-way portion $L_1$ in common, the one-way portions of the circuits LE and LW at the two terminal stations A and B being coupled thereat in conjugate relation with each other and in energy transmitting relation with one end of the two-way link $L_1$ by hybrid coils $H_1$ and $H_2$ and associated balancing networks, respectively, in a manner well known in the art.

The volume control and switching apparatus associated with the paths LE and LW at each terminal station would be the same as used at these stations in the four-wire system of Fig. 1 with the following exceptions: The transmitting side of the path LE at station A and the transmitting side of the path LW at station B are normally disabled at a point 21 in the output of the transmitting volume limiter device $VL_1$ and at a point 22 in the output of the similar device $VL_2$, respectively. Transmitting (sing) suppressor devices $ES_5$ and $ES_6$, not used in the system of Fig. 1, are respectively connected to the transmitting side of the path LE at station A between the suppression point 3 and the device $VL_1$ and to the transmitting side of the path LW at station B between the suppression point 1 and the device $VL_2$. The suppressor device $ES_5$ operates in response to applied west-to-east telephone signals from the path LE to enable that path at the point 21, to disable the receiving side of the path LW at station A at a point 23 in front of the receiving expander device $RE_2$, to disable at the point 24 the expander control 7 for the device $RE_2$ and to disable at the point 25 the receiving suppressor $ES_2$. Operation of the receiving suppressor $ES_2$ disables the transmitting suppressor $ES_5$ at the point 29.

Similarly, the transmitting suppressor $ES_6$ operates in response to applied east-to-west telephone signals from the path LW to enable that path at the point 22; to disable the receiving side of the path LE at station B at a point 26 in front of the receiving expander device $RE_1$; to disable the expander control 6 for the device $RE_1$ at the point 27; and to disable at the point 28 the receiving suppressor device $ES_1$. Operation of the receiving suppressor $ES_1$ disables the transmitting suppressor $ES_6$ at the point 129.

The transmitting (sing) suppressors have been added in the system of Fig. 3 because of the much worse singing problem which can exist at each end of such a system individually when additional gain is necessary in the receiving side to make up for a large line loss of the intermediate two-way link $L_1$, and when the two-wire balance at the hybrid coil connections is low. The anti-singing control in the transmitting side, provided by the suppressors, prevents a cross-echo path which could allow false operation of the receiving suppressor at each end and possibly even singing. It was found that where fairly large losses (20 decibels or more) had to be switched in the transmitting side of such a two-wire connection to provide the necessary acoustic gain between the terminal stations, the combination of such a transmitter switch providing a very high loss and receiving expander switch providing 15 to 25 decibels, in tandem, in the system of Fig. 3, gave satisfactory transmission. The expander action smooths over the abrupt changes in transmission of speech and room noise caused by the suppressor switching.

The operation of the transmitting limiter, receiving expander and receiving suppressor at the two terminal stations otherwise is the same as the corresponding identified apparatus in the system of Fig. 1.

A preferred form of circuit arrangement which would be used for the volume limiter devices $VL_1$ and $VL_2$ and the associated controls shown within the dot-dash boxes 30 and 31, respectively, in the system of Fig. 1, is illustrated schematically in Fig. 4.

The volume limiter circuit of Fig. 4 comprises a vario-repeater consisting of a variable loss pad or vario-losser 33 followed by a single-stage vacuum tube amplifier 34, and a backward-acting control circuit 35 for controlling the loss value of the vario-losser 33 from the output of the amplifier 34.

The vario-losser 33 comprises an input transformer 36, an output transformer 37, and the series copper-oxide rectifier elements 38, 39 and the shunt resistance elements 40, 41, connected between the secondary winding of transformer 36 and the primary winding of transformer 38. The amplifier 34 comprises a single amplifying vacuum tube of the pentode type having energizing circuits for its several electrodes as indicated. The control grid-cathode circuit of tube 34 is connected across the secondary winding of transformer 37. The output circuit of the amplifying tube 34 is coupled by transformer 42 arranged as a hybrid coil to two 600-ohm output paths, one being the main output 43 of the circuit and the other being the input portion of the volume limiter control branch 35.

The control circuit 35 comprises the neon-filled discharge tube 44 followed by the normally operative amplifying vacuum tube 45 also of the pentode type. The plate-cathode circuit of the tube 45 is connected across the mid-point of the secondary winding of transformer 36 and the mid-point of the primary winding of transformer 37 of the vario-losser 33 in such manner that the plate current of the tube 45 flows through the rectifier elements 38, 39 in parallel to provide a direct current bias therefor which will vary in accordance with the changes of plate current to control the amount of loss of the vario-losser 33.

With no voice signal input to the vario-losser 33, the plate current of tube 45 flows through the series rectifier elements 38, 39 in the direction in which they are pointed, so that their series resistance is low.

Now, let it be assumed that voice signals are applied to the input terminals 46, 47 of this volume limiting circuit. These signals passing through the vario-losser 33 will be attenuated somewhat by the fixed shunt resistances 40, 41 in combination with the series rectifier elements 38, 39 and these voice signals will then be impressed by transformer 37 on the input of the amplifying vacuum tube 34 in which they will be amplified in accordance with the gain setting of that tube. The amplified signals will then be divided by the hybrid coil transformer 42, a portion flowing through the main output circuit 43 to the output terminals 48 and 49, and the other portion being diverted into the input of the control circuit 35.

The level of the amplified signals in the output of amplifier 34 which are impressed on the control circuit 35 is directly proportional to the voice signal input applied to the input terminals 46, 47, up to a predetermined amplitude at which volume limiting is desired. When that amplitude level is reached, the signals diverted into the control circuit 35 and applied to the cathode of the neon-filled discharge tube 44 in series with the current limiting resistances 50, 51 will cause ionization to occur in that tube and current will flow from its anode to its cathode. In the particular tube used for tube 44 ionization occurred when the applied signal voltages exceeded 70 volts at the cathode. The potential of the anode is initially in the order of 50 volts positive with respect to the cathode. As current flows from anode to cathode, the suppressor grid 52 of the amplifying tube 45, connected to the cathode of the neon-filled tube 44 as indicated, becomes more negative with respect to the cathode 53 of the amplifying tube with the result that the plate current of the tube which, as previously pointed out, flows through the rectifier elements 38, 39 of the vario-losser 33, decreases to change the bias on these elements so as to produce a proportional increase in series loss provided by the vario-losser and thus a corresponding decrease of over-all gain of the vario-repeater. This gain will continue to be reduced by this limiter action until the signal voltages in the output of the amplifying device 34 diverted into the control circuit 35 are reduced below the ionization potential of the neon-filled tube 44 so that the tube deionizes and the limiter action is stopped.

The volume limiter circuit of Fig. 4 is capable of making a 25-decibel reduction in gain in about 10 or 15 milliseconds. When the voice signals applied to the input terminals 46, 47 are reduced or removed, the limiter allows the potential of the suppressor grid 52 of the amplifying tube 45 to return to normal over a period of about 2 seconds as condenser 54, which is charged up during the period of operation of the neon tube 44, discharges through the shunting resistance 55. Thus, on continued strong speech signals the volume limiter does not have to make a complete reduction of gain on each syllable, but maintains a fairly constant value of gain from syllable to syllable.

The disabling of volume limiter $VL_1$ or of the volume limiter $VL_2$ in the system of Fig. 1 by operation of the control circuit $ES_2$ or $ES_1$, respectively, to reduce the gain of the volume limiter through suppressor control branch 4 or suppressor control branch 2 as described above is accomplished in connection with the volume limiter of Fig. 4 by the action of the associated suppressor (not shown) to short-circuit the leads 56, 57 to provide a discharge path for the condenser 58, which is charged when the neon tube 44 is in the ionized condition. The discharge of the condenser 58 puts the suppressor grid 52 of the amplifier tube 45 at ground potential, or in the order of 50 volts negative with respect to the cathode. The resultant decrease in the plate current of tube 45 changes the bias on the rectifier elements 38, 39 of the vario-losser 33 to increase the loss of the vario-losser and thus reduce the gain of the vario-repeater by approximately 25 decibels. When the receiving suppressor releases, the ungrounded side of condenser 58 is charged positively to about 50 volts through a 0.1-megohm resistance 59, and the operation of the amplifying tube 45 is returned to normal.

The preferred circuit for the transmitting limiter and associated control shown within the dot-dash box 60 in the system of Fig. 2 would be the same as shown in Fig. 4 except for the elimination of the circuit elements for accomplishing the effective disabling of the volume limiter under the control of the associated suppressor as described, since no receiving suppressor is used at station B in the system of Fig. 2.

A preferred form of circuit arrangement which would be used for the transmitting expander-limiter TEL and associated controls shown within the dot-dash box 61 in the system of Fig. 2, is illustrated schematically in Fig. 5.

The circuit of Fig. 5 includes a vario-repeater consisting of a variable loss pad or vario-losser 33 followed by a single-stage vacuum tube amplifier 34, the output of which is connected by hybrid coil transformer 42 to a main output circuit 43 leading to output terminals 48, 49, and a backward-acting volume limiter control branch 35 including the neon tube 44 and the vacuum tube amplifier 45 for controlling the vario-losser 33 to limit the output signals delivered to the output circuit 43 to a predetermined amplitude level determined by the overload and cross-talk limits of the telephone circuit to be connected thereto, which is identical with the vario-repeater and volume limiter control therefor shown in Fig. 4 as indicated by the use of the same characters for identifying the corresponding circuit elements in this figure and Fig. 4.

The circuit of Fig. 5 also includes an "expander control" and a "suppressor" having a common input circuit 62 including the amplifier 63, connected across the primary winding of the input transformer 36 of the vario-losser 33.

The "expander control" comprises in order, the amplifier 63, a rectifier 64, a filter 65, the amplifying vacuum tube 45 used also in the volume limiting control circuit 35; and an auxiliary element, the "expander range" control 66.

The amplifier 63 comprises a single amplifying vacuum tube of the pentode type, similar to the tube 34, the control grid-cathode circuit of which is coupled by the input transformer 67 across the primary winding of the input transformer 36 for the vario-losser 33. The rectifier 64 comprises a bridge circuit having copper-oxide rectifier elements in each of the four arms, the input diagonal of the bridge being coupled by transformer 68 across the anode-cathode circuit of the amplifying tube 63. The input of the filter 65, which is of the condenser-resistance type, is connected across the output diagonal of the rectifier bridge 64. The output of filter 65 is connected across the control grid-cathode circuit of amplifier tube 45 through the lower switch portion S of the "expander range" control device 66, and the plate-cathode circuit of the amplifier tube 45 is connected to the vario-losser circuit 33 as indicated, so that the plate current of the tube flows through its series rectifier elements to vary their resistance in accordance with the amplitude of the plate current, to control the loss of the vario-losser 33.

The "expander range" control device 66 comprises, in addition to the switch portion S, the resistance potentiometers $P_1$ and $P_2$ with their movable arms fixed to the same shaft as the movable arm of the switch S so that the switch and the two potentiometers may be adjusted simultaneously by one manual operation. The variable resistance portion of potentiometer $P_1$ is connected in shunt with the copper-oxide rectifier element in the upper conductor of vario-losser 33, and the variable resistance portion of potentiometer $P_2$ is connected in shunt with the copper-oxide rectifier element in the lower conductor of vario-losser 33, so that when the movable arms of the two potentiometers are rotated simultaneously the amount of resistance in shunt with the rectifier elements will be varied. The values of resistances of the two potentiometers are chosen so that the series resistance of the vario-losser 33 may be manually varied to change the over-all gain of the vario-repeater over a range extending from zero to 25 decibels.

When the movable arms of the potentiometers $P_1$ and $P_2$ are moved to any contacts other than their zero contacts, the position of the movable arm of the switch S will be such that the 1-megohm resistance 69 is connected to the filter 65 for a purpose which will be described later in connection with the following complete description of operation of the expander control circuit. When the movable arms of potentiometers $P_1$ and $P_2$, and thus the movable arm of switch S, are in the (zero) contact positions, the resistance 69 is connected directly to the cathode of the tube 45 thus providing zero control grid bias for that tube.

With no signal input applied to the input terminals 71, 72 of the vario-repeater, only a fraction of a milliampere of direct current flows in the plate circuit of the amplifier tube 45 through the variable series rectifier elements of the vario-losser 33 with the result that the series resistance provided by the vario-losser in the transmission circuit is high.

When a signal input is applied to the input terminals 71, 72, part of this input is transmitted through the transformer 36 to the vario-losser 33, and part is transmitted through the common input circuit 62 into the expander control and suppressor circuits. The signals passing through the vario-losser 33 are attenuated therein by the fixed shunt resistance elements in combination with the variable series rectifier elements, and are then impressed by transformer 37 on the input of the amplifying device 34. The amplified signals in the output of amplifier 34 are divided by the hybrid coil transformer 42 between the main output circuit 43 and the input of the volume limiter control circuit 35.

In the common input circuit 62 for the expanded control and suppressor circuits, the secondary winding of the input transformer 67 is tapped to provide a range of adjustment in expander control and suppressor sensitivity. From the secondary winding of the transformer 67 the speech signals pass through the series resistances 73 and 74 to the control grid of the amplifying vacuum tube 63. The retard coil 75 shunting the input circuit of the latter tube between the resistances 73 and 74 is used to provide a broad tuning with a maximum point at about 900 cycles, to the sensitivity-frequency characteristic of both the expander control circuit and the suppressor circuit. The output of amplifier 63 divides, with part of the signal energy going through the transformer 68 into the individual portion of the expander control circuit, and part going into the individual portion of the suppressor circuit through condenser 76 and resistance 77 in series, connected across the plate-cathode circuit of the amplifying tube 63.

The part of the signal output of tube 63 that passes through the transformer 68 is rectified by the copper-oxide rectifier bridge 64. The direct current output of rectifier 64 passes through the resistance-condenser filter 65 to the control grid of the amplifying tube 45, provided the expander range switch 66 is not set on the (0) contact. The plate current of the amplifying tube 45 flows through the series rectifier elements of the vario-losser 33, controlling the series resistance in the vario-losser in accordance with its amplitude.

The polarity of the rectified direct current from rectifier 64 is such that it makes the control grid of the tube 45 more positive. With no signal input, the control grid of tube 45 is almost at cut-off potential so that only a fraction of a milliampere plate current flows through the series rectifier elements of the vario-losser 33. With increasing signal input to the expander control circuit, the rectified direct current in the output of rectifier 64 decreases the negative bias on the control grid of the tube, causing more plate current to flow in the series rectifier elements of vario-losser 33, which in turn increases the over-all gain of the vario-repeater. This characteristic extends for only a limited range, after which further increase of input makes no change of gain.

The latter result is produced because of the effect of the (1-megohm) resistance 69 which is connected in series with the control grid of the tube 45 for all positions except the (0) position of the expander range switch S and insures that the control grid-cathode potential of that tube cannot become more than a fraction of a volt positive, and also because of the effect of the rectifier element 70 in the control grid circuit of tube 45 which insures that the potential applied to the resistance 79 and condenser 80 of the filter 65 will not be more than very slightly positive with respect to the cathode of the tube 45. The rectifier element 70 also serves the useful purpose of preventing excessively fast action of the expander-control on suddenly applied high amplitude signals. Without rectifier 70, sufficient gain could be built up in the device to get a very brief singing condition resulting in a "pop" around the circuit before the suppressor circuit completes its operation.

The volume limiter portion 35 of the circuit of Fig. 5 operates in a manner similar to that described for the similar volume limiter circuit shown in Fig. 4 to change the current flowing in the series rectifier elements of the vario-losser 33 when the signal level in the output of the amplifier 34 exceeds the predetermined volume limiting amplitude, to reduce the overall gain of the vario-repeater. The gain will continue to be reduced by this limiter action until the output signal voltages of the vario-repeater no longer cause ionization in the neon-filled tube 44, or until the plate current of the tube 45 is reduced to zero. The volume limiter may reduce the gain from its maximum value only by as many decibels as the expander range switch 66 indicates, except in the case of (0) setting. When the expander range switch 66 is on the (0) setting, the volume limiter may make as much as a 25-decibel reduction from maximum gain. It is of interest to note that even though the control grid of tube 45 is driven as far positive as possible by the combined action of rectifier 64, filter 65, resistance 69 and limiting rectifier 70, the action of the limiter circuit on the suppressor grid 52 may be made to cause the space current of tube 45 to drop to zero if that is necessary.

As in the case of the similar volume limiter circuit of Fig. 4, the short-circuiting of the leads 56, 57 in response to a receiving suppressor (not shown) discharges condenser 58, which puts the suppressor grid of the tube 52 at ground potential, or in the order of 50 volts negative with respect to the cathode, effectively disabling the amplifying tube 45 and preventing its subsequent operation by the expander control circuit to increase the over-all gain of the vario-repeater. When the receiving suppressor releases, the ungrounded side of the condenser 58 is charged positively to about 50 volts through the 0.1-megohm resistance 59, and tube 45 returns to its normal condition.

The part of the output of the amplifying tube 63 transmitted into the individual portion of transmitting suppressor control circuit through the condenser 76 and resistance 77 connected in shunt with the plate circuit of the tube 63, is applied to the control grid of the amplifying tube 78 through the potentiometer 81. The sensitivity of the transmitting suppressor circuit is initially determined by the setting of the tapped secondary winding of the transformer 67 of the input circuit 62. In addition, the setting of the potentiometer 81 gives further control of the suppressor sensitivity.

The amplified signal output of the amplifying tube 78 normally passes through the transformer 82 to the input of the copper-oxide rectifier bridge 83, the leads 84, 85 being normally connected together when the receiving suppressor (not shown) is in the unoperated condition. This normal operation is indicated in the system of Fig. 2 by the normal closed condition of the contacts 13 in the output of the suppressor $ES_4$ within the dot-dash box 61. With the receiving suppressor operated, in the circuit of Fig. 5 the connection between leads 84, 85 would be open so that the signal output of the tube 78 could not be transmitted to the rectifier bridge 83, and the suppressor control circuit would therefore be disabled.

Assuming the receiving suppressor circuit unoperated, the signal input to the rectifier bridge 83 will be rectified thereby and applied to the winding of the master suppressor relay 86 connected to the output diagonal of rectifier bridge 83, and will cause operation of the latter relay. Operation of the relay 86 will break its armature and back contact to break the normal connection between the leads 88, 89 to disable the receiving suppressor (not shown), which, while the circuit of Fig. 5 is used for the transmitting expander-limiter TEL in the system of Fig. 2, would be accomplished by the opening of the normally closed contacts 14 in the output of the receiving suppressor $ES_3$.

The operation of relay 86 will also close its armature and front contact 90 to cause the energization of the windings of the relays 91 and 124. The consequent operation of relay 91 will close its contacts to disable the expander control for the receiving expander device $RE_3$ in the opposite side LW of the four-wire circuit at the point 12, as by shorting and thus discharging a condenser in that control, corresponding to the condenser 58 in the similar expander control of the transmitting expander-limiter shown in Fig. 5.

The simultaneous operation of the relay 124 will open its contacts to disable the receiving side of the path LW at station A at a point 10 in front of the receiving expander device $RE_3$ by controlling a loss network to insert a large loss in the path at that point as indicated.

When the master relay 86 releases with cessation in the supply of controlling energy thereto, the opening of its front contacts will break the normal energizing circuit for the winding of relays 91 and 124, but the latter relays will be maintained operated for a desired hang-over interval while the condenser 93 is being charged by current flowing from battery through the resistance 94 and the windings of the relays 91 and 124, to maintain the path LW, and the receiving suppressor and receiving expander control disabled for that interval of time. In an experimental circuit, this hang-over was approximately 0.18 second, and was obtained by proper selection of the constants of the hang-over circuit.

The preferred circuit arrangements for the receiving expander $RE_3$ and associated controls within the dot-dash box 92 in the unsymmetrical four-wire system of Fig. 2, and for the receiving expanders $RE_1$ and $RE_2$ and associated controls shown within the dot-dash boxes 121 and 122 in the two-wire system of Fig. 3, are identical with the circuit arrangement for the transmitting expander-limiter illustrated in Fig. 5 with the following exceptions. The volume limiter portion 35 including the neon-filled tube 44 for controlling the tube 45 through its suppressor grid to limit the gain of the vario-repeater to a predetermined maximum, shown in Fig. 5 and described above, is eliminated in each case, the suppressor grid 52 of tube 44 being still used, however, as shown in Fig. 5 to disable the action of the expander control when the suppressor connected to the transmitting path at the same station operates, by short-circuiting the leads 56, 57 across condenser 58 as in the circuit of Fig. 5.

The preferred circuit arrangement for the receiving expanders $RE_1$ and $RE_2$ and associated controls, shown within the dot-dash boxes 95 and 96, respectively, in the symmetrical four-wire system of Fig. 1, are the same as described above for the receiving expanders and associated controls within the dot-dash box 92 of Fig. 2 and within the dot-dash boxes 93 and 94 of Fig. 3, except for the elimination of the expander control disabling feature employing the suppressor grid of tube 45 and the condenser 58, and the elimination of the suppressor disabling feature employing the opening of the back contacts of relay 86 to break a normal connection between leads 88 and 89, these features not being required in the system of Fig. 1.

Fig. 6 shows schematically the preferred circuit arrangement for the transmitting volume limiter $VL_1$ or $VL_2$ and associated controls shown within the dot-dash boxes 97 and 98, respectively, and the associated anti-singing control 21 or 22 in the system of Fig. 3.

The volume limiter portion of the circuit of Fig. 6, including the vario-losser 33 and the amplifying tube 34 of the vario-repeater, the backward-acting volume limiting branch 35 including the neon-filled tube 44 and the amplifying tube 45 for controlling the losser 33 to give the required volume limiting action, and the disabling circuit controlled from the receiving echo suppressor including the leads 56, 57 and the condenser 58, are identical with the volume limiting circuit shown in Fig. 4 and described above, as indicated by the use of the same characters for identifying the corresponding elements.

The circuit of Fig. 6 also includes a transmitting suppressor branch 100, similar to that described in connection with Fig. 5, having its input connected across the signal transmission circuit in front of the vario-losser 33 by input transformer 101.

The transmitting suppressor circuit 100 comprises in order, an amplifier consisting of two pentode vacuum tube amplifying stages 102 and 103 connected in tandem through a condenser-resistance coupling 99, a copper-oxide rectifier bridge 104 having its input diagonal connected to the output of the amplifier tube 103 by transformer 105, and the transmitting master relay 106 connected across the output diagonal of the rectifier bridge 104.

With no voice signals applied to the input terminals 107, 108 of the circuit of Fig. 6, the transmitting circuit TC is blocked by a short-circuiting connection 109 at a point in the output of the vario-repeater, and the receiving circuit RC is normally operative at a point in front of the receiving expander, corresponding respectively to the points 21 and 23 at station A or the points 22 and 26 at station B in the system of Fig. 3.

Now let it be assumed that voice signals are applied to the input terminals 107, 108 of the circuit of Fig. 6. A portion of these signals will be transmitted through the vario-losser 33 in which they will be attenuated by the fixed shunt resistances in combination with the series rectifier elements of the vario-losser, and the attenuated voice signals will then be amplified by the amplifier 34. The amplified signals will be divided by the transformer 42 between the outgoing portion 45 of the transmitting circuit and the input of the control circuit 35. The portion diverted into the control circuit 35 when the amplitude level thereof is above the predetermined volume limiting level will operate that circuit to adjust the loss value of the vario-losser 33 in the manner which has been described in connection with the similar circuit of Fig. 4, to limit the signal output of amplifier 34 to a level within the overload limits of the circuit TC.

The portion of the received signals diverted into the transmitting suppressor circuit 100, the sensitivity of that circuit having been adjusted to the desired value by adjustment of the tap on the secondary winding of transformer 101 of the interstage potentiometer 110, in a manner previously described in connection with the similar elements of the transmitting suppressor in connection with Fig. 5, and will be amplified by the amplifying tubes 102 and 103.

The amplified signal output of the amplifying tube 103, the leads 111, 112 being normally connected together when the receiving suppressor (not shown) is in the operated condition, will pass through a transformer 105 to the rectifier bridge 104. The rectified signal output of the latter will energize the winding of the master suppressor relay 106, causing its operation.

Relay 106 operated will open its back contacts 113 to open the circuit 114 to disable the receiving suppressor (not shown). Relay 106 operated through its front contact also completes an energizing circuit from battery 115 for the windings of relays 116, 117 and 118 causing their operation. Relay 116 will operate to break the normal short-circuiting connection 109 across the transmitting circuit TC allowing the transmission of the amplified signals from the output of amplifier 34 thereover to the distant station. Relay 117 will simultaneously operate to open the cross-connection 119 to change the loss network 123 located in front of the receiving expander device ($RE_1$ or $RE_2$ in the system of Fig. 3) in the receiving circuit RC at the same terminal from the normal low loss to a high loss condition disabling that circuit. Relay 118 will simultaneously operate to close a circuit 120 to insert a loss in the circuit of the receiving expander device, as by shorting out the condenser 58 in the circuit of Fig. 5, for example, or in any other suitable manner.

Various modifications of the systems of the invention which have been illustrated and described will occur to persons skilled in the art. It is to be understood that the particular values of the circuit elements, and the values for sound levels, volumes and gains specified in the above description are to be taken by way of example only, and not as limiting the invention.

What is claimed is:

1. In a two-way signaling system comprising at least over a portion of its length oppositely directed one-way transmission paths for repeating the signals for the opposite directions of transmission, the combination of a limited volume range expander in each path with an associated signal-controlled echo suppressor operating at an intermediate point in the expansion range of said expander, to provide a predetermined amount of over-all gain between terminals of the system while preventing singing and suppressing echoes and noise.

2. In a two-way telephone signaling system including at least at the terminals of the system oppositely directed one-way transmission paths for repeating the telephone signals in opposite directions, means for producing an appreciable over-all gain between terminals of the system while preventing singing and suppressing objectionable echoes and noise, comprising a volume limiter in the transmitting path at each terminal for maintaining the transmitted signal energy within the overload and cross-talk limits of the system, a limited volume range expander in the receiving path at each terminal, and switching means connected to the receiving path at each terminal in front of the expander therein, responsive to received signals of a level within the expansion range of the expander to insert a large disabling loss in the transmitting path at the terminal.

3. The system of claim 1 in which said limited volume range expander operates automatically in response to applied signals to remove loss from the repeating path in the path in which it is connected smoothly in an amount depending on the strength of said applied signals so as to prevent signal clipping.

4. In a two-way signaling system, one-way transmission paths for the signals transmitted in opposite directions, a normal loss included in each path, means responsive to transmitted signals in each path to remove loss therefrom in an amount proportional to the amplitude of the signals up to a certain point, and independent means responsive to the transmitted signals in each path to insert a large disabling loss in the other transmission path when the amount of loss removed by the first means from the first path is slightly less than that which would produce singing around the system and objectionable echoes.

5. In combination in a two-way telephone signaling system comprising oppositely directed one-way transmission paths for repeating telephone signals in opposite directions, a signal expander in each path operating effectively to increase the gain of the path in proportion to the increase in the volume level of applied signals within a limited volume range, means for limiting the amplitude of the signals transmitted over each path to a given maximum value determined by the overload and cross-talk limits of the path, and a switching device connected to each path at a point adjacent the expander therein, operating in response to applied signals to disable the other path in front of the expander therein and to disable the switching device connected to the other path, the sensitivity of each switching device being adjusted so that it will only operate in response to applied signals of a minimum level part way up the expansion range of the adjacent expander.

6. In a two-way telephone signaling system, comprising oppositely directed one-way transmission paths for repeating the telephone signals in opposite directions, a variable gain amplifier in each path near a terminal of said system, means for automatically increasing the gain of the amplifier in each path in proportion to the increase in the amplitude level of applied telephone signals within a limited volume range, up to a certain maximum gain determined by the overload limits of the path, and a switching device connected to each path at a point adjacent the amplifier therein, responsive to applied signals of a minimum level part way up the amplifying range of that amplifier, to insert a large disabling loss at a point in the other path in front of the amplifier therein, and to disable the switching device connected to said other path.

7. In combination with a two-way telephone signaling system comprising a two-way telephone line connecting terminal stations each including a transmitting circuit and a receiving circuit, means for producing an appreciable over-all gain in the signal transmission between said stations in either direction, while preventing singing and suppressing objectionable echoes and noise, comprising at each terminal station a volume limiter in the transmitting circuit for maintaining the transmitted signal energy within the over-load and cross-talk limits of the system, a limited volume range expander in the receiving circuit for increasing the gain of that circuit in proportion to increases in the amplitude level of received signals, up to a predetermined point of maximum gain, means normally disabling the transmitting circuit at a point in the output of the volume limiter, and switching means respectively connected to the transmitting circuit in front of the volume limiter and to the receiving circuit in front of the receiving expander, the switching means connected to the transmitting circuit being responsive to outgoing signals, in the absence of prior incoming signals in the receiving circuit at the terminal, to remove the normal disability in the transmitting circuit and to simultaneously disable the receiving circuit at the station in front of the expander, the control for that expander and the switching device connected to the receiving circuit, when that circuit is operative, being responsive to incoming signals of a level part way up the expansion range of the expander in that circuit, to disable the transmitting circuit at the station in front of the volume limiter therein, and to simultaneously disable the switching circuit connected to the transmitting circuit at the station.

8. In combination, a two-way signaling system including oppositely directed one-way transmission paths at the terminals thereof for repeating the signals transmitted in opposite directions, and a limited volume range expander in the transmitting path of at least one terminal, operating as a combined amplifier and singing suppressor.

9. In a two-way signaling system including oppositely directed one-way transmission paths at the terminals thereof for repeating the signals transmitted in opposite directions, the combination of a limited volume range expander in a repeating path at one terminal and a vodas switching device operated from one of the repeating paths at the other terminal, for providing the desired amount of transmission gain between terminals while suppressing echoes and preventing singing.

10. In a two-way signaling system including at least near the terminals thereof oppositely directed one-way transmission paths for repeating the signals transmitted in opposite directions, an expander type singing suppressor in a repeating path for each direction.

11. In a two-way telephone system including a four-wire telephone circuit for repeating the telephone signals in opposite directions, a limited volume range expander in each side of said circuit in combination with a voice-operated switching device, operating to increase the transmission efficiency of the side of said circuit transmitting signals and to effectively disable the other side of said circuit.

12. In a two-way signaling system comprising oppositely directed one-way repeating paths for the signals transmitted in opposite directions, an expander type singing suppressor controlled by the signals transmitted over one of said paths, and a vodas type singing suppressor controlled by the signals transmitted over the other repeating path.

13. A two-way telephone transmission system including a four-wire circuit consisting of two normally operative, one-way telephone transmission paths for repeating telephone signals in opposite directions, a limited volume range expander in each of said paths near its output, responsive to applied telephone signals to increase the transmitting efficiency of that path and independent voice-operated switching devices respectively connected to each path at a point adjacent the input of the expander therein, responsive to telephone signals received from that path to decrease the transmitting efficiency of the other path at a point near its input.

14. In combination, a two-way signaling system including oppositely directed one-way transmission paths at the terminals thereof for repeating the signals transmitted in opposite directions, and a limited volume range expander in at least one of said paths near one terminal, said expander including a variable loss device of a normal loss value tending to prevent the setting up of a singing condition in said paths during periods of no signal transmission.

15. A two-way communication system comprising two normally operative telephonic communication channels each having an input telephone transmitter and an output loud speaking telephone receiver, the transmitter of each channel being located closely adjacent to the loud speaking receiver of the other channel, each of said channels including a vario-repeater, and control means responsive to telephonic signals transmitted over each channel to vary the gain of the vario-repeater therein so as to increase the transmitting efficiency of that channel, and to disable the other channel at a point in front of the vario-repeater therein, said vario-repeater comprising a variable loss pad followed by an amplifier, said control means operating to increase the gain of said vario-repeater by reducing the loss value of said pad.

16. A two-way communication system comprising two normally operative telephone transmission channels each having an input transmitter and output loud speaking telephone receiver, the transmitter of each channel being located closely adjacent the receiver of the other channel, a vario-repeater in each channel, comprising an amplifier, a variable attenuation network and a control circuit therefor, the normal loss value of the variable attenuation networks in the two channels being selected such as to prevent the setting up of a singing condition in said channels due to electrical and acoustic couplings therebetween, in the absence of telephonic signal transmission in said channels, the control circuit for each vario-repeater being responsive to the signals applied thereto to apply to its attenuation network a control potential which will decrease the loss value thereof and thereby effectively increase the gain of the vario-repeater in accordance with the amplitude level of the signals up to a predetermined limiting value, and means for disabling each channel at a point in front of the vario-repeater therein when the gain of the vario-repeater in the other channel is increased.

17. A two-way communication system comprising two normally operative telephone signal transmission channels each having an input telephone transmitter and an output loud speaking telephone receiver, the transmitter of each channel being located closely adjacent the loud speaking receiver of the other channel, a vario-repeater in each channel, comprising an amplifier, a variable loss pad and a control circuit therefor, the normal loss values of the variable loss pads in said channels being selected to limit the gain thereof during periods of no signal transmission to values which will prevent the setting up of a singing condition by noise in said channels due to the acoustic couplings therebetween, the control circuit for each vario-repeater being responsive to the application of signals thereto to vary the loss value of the loss pad in that vario-repeater to effectively increase the gain of the latter proportional to the signal amplitude level up to a predetermined limiting value, and independent voice-operated switching devices respectively responsive to the telephone signals applied to the input of the vario-repeater in a different channel to increase the attenuation of the other channel at a point in front of the vario-repeater therein, to maintain a margin against singing and to suppress signal echoes and noise.

18. The system of claim 17, in which the vario-repeater in each channel is located near its output and the associated voice-operated switching device operates to effectively disable the other channel near its input.

19. The system of claim 17, in which each of said channels includes near its input an automatic volume limiter operating to maintain the volumes of transmitted telephone signals within the overload limits of the channel, and the voice-operated switching device associated with the vario-repeater in each channel operates to effectively disable the other channel near its input and to reduce the gain of the volume limiter in the latter channel by a predetermined amount.

DOREN MITCHELL.